Figure 1:
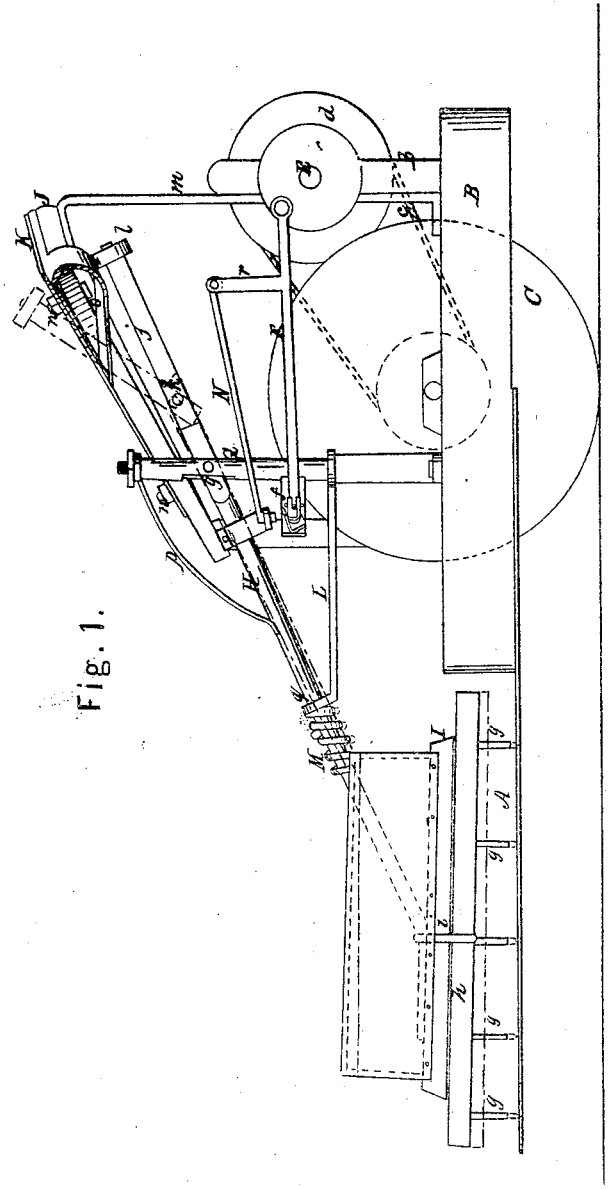

J. Young.
Harvester Rake.

N° 22326. Patented Dec. 14, 1858.

Sheet 1.
2 Sheets.

Witnesses.

Inventor.
Joseph Young

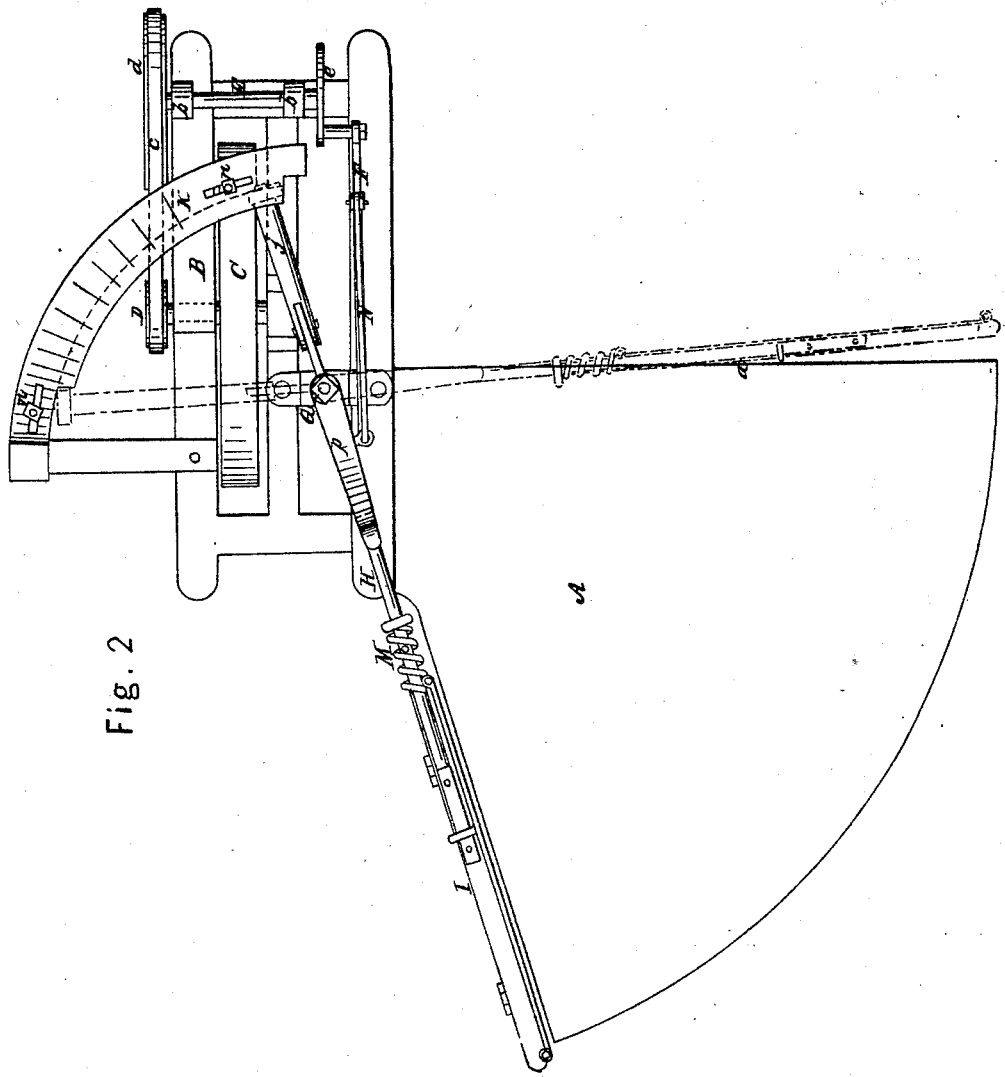

UNITED STATES PATENT OFFICE.

JOS. YOUNG, OF MARSHALLTON, PENNSYLVANIA.

IMPROVEMENT IN RAKING ATTACHMENTS TO HARVESTERS.

Specification forming part of Letters Patent No. 22,326, dated December 14, 1858.

*To all whom it may concern:*

Be it known that I, JOSEPH YOUNG, of Marshallton, in the county of Chester and State of Pennsylvania, have invented a new and Improved Raking Attachment for Harvesters; and I do hereby declare that the following is a full, clear, and exact description of the same, reference being had to the annexed drawings, making a part of this specification, in which—

Figure 1 is a side view of my invention. Fig. 2 is a plan or top view of the same.

Similar letters of reference indicate corresponding parts in the two figures.

This invention relates to a peculiar means employed for operating a rake, as hereinafter fully shown and described, whereby the grain is raked in gavels from the platform and discharged from the platform longitudinally with the plane of the movement of the harvester to which the improvement is attached.

To enable those skilled in the art to fully understand and construct my invention, I will proceed to describe it.

A represents the platform of a reaper or harvester.

B is the main frame of the reaper, to which the platform is attached. The platform is made in the form of a quadrant or sector, as shown clearly in Fig. 2, the sickle (not represented) being at the front end, $a$, of the platform, as usual.

C is the driving-wheel, which is placed in the main frame B; and D is a pulley, which is placed in the outer end of the axle of the wheel C.

E is a shaft, which has its bearings in uprights $b\ b$ on the front part of the main frame B. This shaft is driven by a chain, $c$, from the pulley D of the axle of wheel C, said chain passing over a pulley, $d$, on the outer end of the shaft E. To the inner end of the shaft E a crank-pulley, $e$, is attached, and to the crank-pulley $e$ one end of a jointed connecting-rod, F, is secured, the opposite end of said rod being attached to an arm, $f$, which projects at right angles from a vertical shaft, G, placed in the main frame A. The shaft is allowed to turn freely in its bearings in the main frame A.

H is a rake-bar, which passes through the shaft G, and is secured therein by a pivot, $g$, as shown clearly in Fig. 1. To the lower end of the rake-bar H a rake-head, I, is attached.

The rake-teeth $g$ are fitted in a flap, $h$, which is jointed to the head I, and has a spring, $i$, attached to keep the flap in a proper position with the head. To the upper end of the bar H a rod, $j$, is attached by a pivot, $k$. The rod $j$ is allowed to turn or swing upward, but is prevented from turning downward, in consequence of the form of the joint. On the outer end of the rod $j$ a friction-roller, $l$, is placed. To the main frame B two uprights, $m\ m$, are attached, and J is a curved inclined plane, which is attached to the upper ends of the uprights $m\ m$. To the inclined plane J a metal plate, K, is attached by screw-bolts $n\ n$, and to the under side of the plate K, at its upper end, a curved ledge or projection, $o$, is attached. The form of this projection is plainly shown in Fig. 1. To the upper end of the shaft G a spring, $p$, is attached, and this spring bears on the rake-bar H, having a tendency to keep the rake-head down on the platform A.

L is a brace, which is attached to the shaft G, the rake-bar H passing through a loop, $q$, at the outer end of the same.

M is a nut or adjustable spiral coil placed on the rake-bar. The use of this nut or spiral coil will be presently shown. The jointed connecting-rod F has an upright, $r$, attached to it, and the upper end of this upright is connected by a jointed rod, N, with the rake-bar H.

The operation is as follows: As the machine is drawn along the shaft E is rotated from the axle of the driving-wheel C by the chain $c$, and the crank-pulley $e$ and jointed connecting-rod F give a reciprocating partially-rotating movement to the shaft G and also to the rake-bar H, the rake-head I traversing over the platform A in the arc of a circle and raking the cut grain therefrom. The rake-head, however, has two motions or movements, it having an up-and-down movement, as well as the one previously referred to. The up-and-down movement is given the rake-head by means of the inclined plate K and the rod $j$ and spring $p$, the roller $l$ of the rod $j$ passing up the plate K as the rake-head moves backward on the platform and rakes off the cut grain, the rod $j$ bending upward to permit the roller $l$ to pass up the plate, the roller passing underneath the plate K and lifting the rake as it moves forward to the front end of the platform. The projection or ledge $o$ on the under side of the plate K raises the rake-head suddenly at the termination of its backward stroke, so that it may clear the falling the grain, and the flap h also prevents any backward action of the rake-head on the grain. The upper jointed connecting-rod, N, gives a direct pull on the rake-bar and prevents the same being subjected to any undue strain, while the nut M regulates or determines the downward movement of the rake-head. The plate K is rendered adjustable by means of slots $a^x$, through which the screw-bolts n n pass, so that it may be made to occupy the proper position in order to actuate the rake-head properly as regards its rising-and-falling movement.

This invention has been practically tested and has been found to operate well. It is not liable to get out of repair nor become deranged while in operation.

I am aware that rakes vibrating or moving in the arc of a circle have been previously used, and I therefore do not claim broadly such device; but,

Having thus described my invention, what I claim as new, and desire to secure by Letters Patent, is—

The arrangement of the rake-bar H, shaft G, rod j, provided with friction-roller l, jointed connecting-rods F N, attached to crank-pulley e, inclined adjustable plate K, spring p, and nut M, substantially as and for the purpose set forth.

JOSEPH YOUNG.

Witnesses:
ALBERT WAY,
MOSES S. WOODWARD.